United States Patent [19]
Waaske

[11] 3,974,513
[45] Aug. 10, 1976

[54] CAMERA ACCESSORY SECURING MEANS

[75] Inventor: Heinz Waaske, Mascherode, Germany

[73] Assignee: Rollei-Werke Franke & Heidecke, Braunschweig, Germany

[22] Filed: Nov. 20, 1974

[21] Appl. No.: 525,410

[30] Foreign Application Priority Data
Nov. 24, 1973 Germany............................ 2358576

[52] U.S. Cl................................. 354/295; 354/80; 354/126; 354/288
[51] Int. Cl.²........................................ G03B 11/00
[58] Field of Search ............... 350/257; 354/80, 75, 354/126, 202, 286, 288, 354, 295

[56] References Cited
UNITED STATES PATENTS
| | | | |
|---|---|---|---|
| 2,762,261 | 9/1956 | Herden | 350/257 |
| 3,469,514 | 9/1969 | Denk | 354/202 X |
| 3,782,260 | 1/1974 | Ettischer et al. | 354/286 |

*Primary Examiner*—John Gonzales
*Attorney, Agent, or Firm*—Stonebraker, Shepard & Stephens

[57] ABSTRACT

A spring-tightened bayonet-type connection for securing an accessory (for example, a flash unit) to a camera housing. A threaded pin or bolt on the accessory carries a cross bar or head of non-circular shape which can pass, in one position of orientation, through a similarly shaped opening in the camera housing. When the bolt is turned, the ends of the cross bar engage behind the edges of the cavity in which the cross bar is received, and the screw thread action of the bolt draws the cross bar against the engaging parts of the camera to draw the accessory firmly against the camera housing. A spring pressed rack meshing with a pinion on the bolt tends to turn the bolt in a tightening direction. A plunger operated latch holds the rack in a spring tensioned position where the bolt is loose and its head or cross bar is oriented to pass into or out of the cavity in the camera. When the accessory and the camera are brought together, the latch is automatically released, allowing the spring pressed rack to tighten the bolt.

8 Claims, 6 Drawing Figures

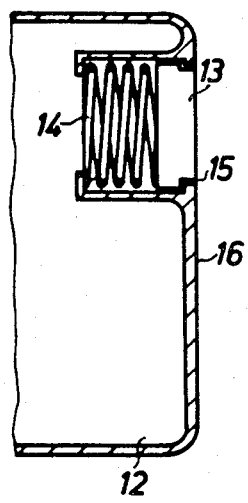
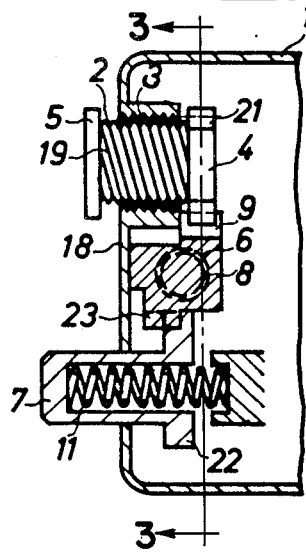
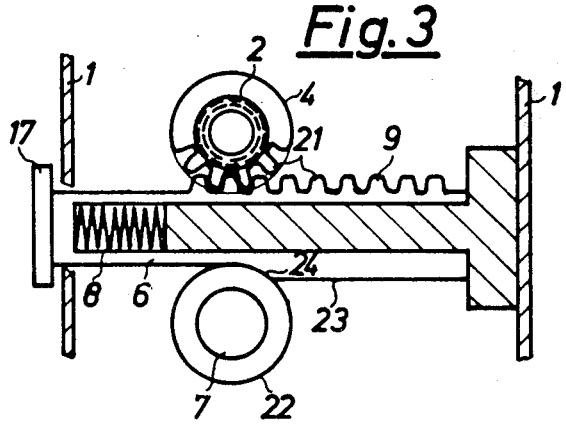

CAMERA ACCESSORY SECURING MEANS

BACKGROUND OF THE INVENTION

The invention relates to means for securing an accessory easily, firmly, and quickly to a camera, while permitting easy and quick removal from the camera when desired. The accessory may be, for example, a flash unit, or a bracket for holding some other article or unit, or a tripod or unipod for supporting the camera, or any other kind or type of accessory.

Detachable connections between camera housings and camera accessories are generally in the form of positively or frictionally connected bayonet-type connections with wedge-shaped or screw-type ends. Bayonet connections of this kind, with multi-part bayonet lugs and a wedge-shaped end, for example, require close manufacturing tolerances, both in the receiving part and the inserted part, rendering such products quite expensive, particularly when produced by precision engineering methods. Moreover, bayonet connections have to be carefully inserted and locked by hand, so that they will not tilt or rattle or even fall out of the socket provided for them on the apparatus. With the continuing miniaturization of cameras and their accessories, furthermore, it is becoming increasingly difficult to find the space to accommodate bayonet connections with multi-part bayonet lugs, in small camera housings.

An object of the invention is to provide, without the known drawbacks, a detachable connection between the camera body or housing and its accessory, enabling the accessory to be rapidly applied and reliably secured, with a very simple structure easy to manufacture and requiring no narrow or close tolerances and providing a compact construction.

The invention enables this object to be achieved by means of a bayonet-type lock rotatably mounted on the accessory, and a cooperating pre-stressed spring which tends to rotate the lock, and which can be latched in the stressed position. In one version of the invention, there is a manually accessible handle for pre-stressing the spring which tends to tighten the lock, and a latch, conveniently of the roller type, for latching the pre-stressed spring in its stressed condition or position. Preferably also a latch releasing member is situated in the approach path between the accessory and the camera, so that as the accessory is brought into cooperative relationship to the camera, the latch is automatically released and the prestressed spring may act to tighten the lock.

Advantageously, there is a manually accessible handle which may be manipulated quickly to stress the spring to its pre-stressed condition and simultaneously to rotate a locking member to release the lock so as to enable the accessory to be separated from the camera. Preferably this handle is operatively connected to the lock through a rack and pinion.

With this arrangement, suitable pressure exerted on the handle will always prepare the accessory to be reliably connected to the camera, without any problem.

BRIEF DESCRIPTION OF THE DRAWINGS

FIG. 1 is a section through a fragment of the housing of a camera accessory, and through the principal parts of the securing means mounted on the accessory, according to a preferred embodiment of the invention;

FIG. 2 is a similar section through a fragment of a camera housing and the parts of the securing means which are mounted on the camera housing;

FIG. 3 is a fragmentary section taken approximately on the line 3—3 of FIG. 1;

DESCRIPTION OF THE PREFERRED EMBODIMENT

Figure 6:
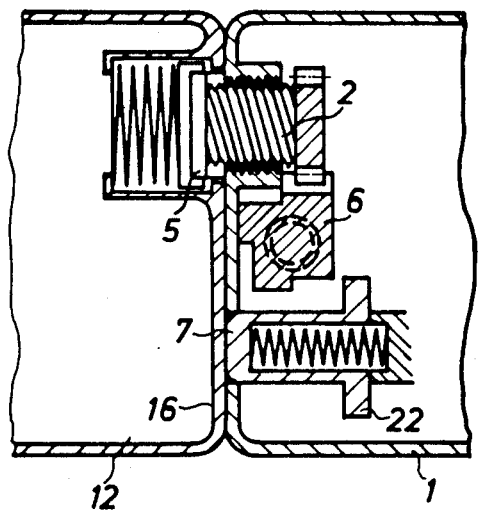
FIG. 6 is a view similar to a combination of FIGS. 1 and 2, showing the parts in the relationship when the accessory is in contact with and latched to the camera.

A fragment of the housing or casing of the accessory is indicated at 1 in FIGS. 1 and 6, and a fragment of the housing or casing of the camera is indicated at 12 in FIGS. 2 and 6. The parts will be described on the assumption that the projecting parts of the securing means are mounted on the accessory element, and that the receiving or cavity portion of the securing means is on the camera element, but obviously this arrangement can be reversed if desired.

The accessory element is provided with a pin or bolt member 2 having screw threads 19 which mesh with internal threads in a bushing 3 rigidly fixed to the housing 1 or some fixed part therein. At its rear end the bolt 2 carries a pinion 4 having teeth 21. The pinion may be a separate member fixed rigidly to the rear end of the bolt, or may be formed by teeth cut into the integral metal from which the bolt is formed.

Figure 4:
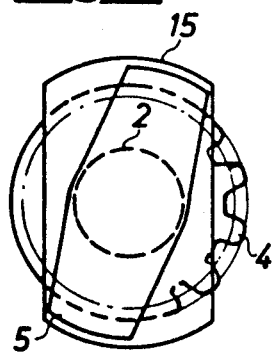
FIG. 4 is a schematic view illustrating the relation of the bolt head or cross bar mounted on the accessory to the opening in which it is received in the camera, with the cross bar oriented to pass into and out of the opening.
Figure 5:
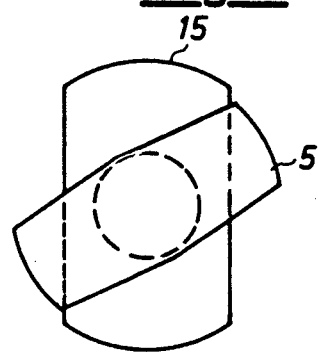
FIG. 5 is a similar view with the cross bar turned to a locking or engaging position.

At its forward end, the bolt or shank 2 carries a head 5 of non-circular outline, preferably in the form of a cross bar or diametrical member considerably elongated with respect to its width, as indicated in FIGS. 4 and 5. In one position of orientation, shown in FIG. 4, this head or cross bar 5 can pass through a somewhat similarly shaped opening 15 in the housing 12 of the camera, and then when the bolt or shank 2 is turned to bring the cross bar 5 to a different position of orientation, such as shown in FIG. 5, the ends of the cross bar engage behind the wall material having the opening 15 therein. At the same time, this turning of the bolt 2 causes the screw threads 19 to draw the bolt inwardly relative to the accessory housing 1, to tighten the engagement with the cooperating part of the camera housing 12.

The teeth 21 of the pinion 4 engage with rack teeth 9 on a rack member 6 mounted within the accessory housing 1 to slide in a direction transverse to the axis of the bolt or shank 2. As best seen in FIG. 3, a spring 8 tends to move the rack member 6 leftwardly when viewed as in FIG. 3, and such movement will rotate the bolt 2 in a direction to tighten it and draw the head or cross piece 5 firmly against the cooperating surface of the camera housing 12. When the rack bar 6 is moved to its rightward limit of motion, as shown in FIG. 3, with the spring 8 fully stressed or compressed, the bolt 2 is in the position to have the cross piece or head 5 oriented as shown in FIG. 4, that is, in a position in which it may pass axially through the opening 15 of the camera. The rack bar 6 is releasably latched in this position by a latch which may be described as a roller-type latch, comprising a latch member of plunger 7 extending through the same wall of the housing 1 through which the bolt 2 extends, and having at its rear end an enlarged circular flange 22. The rack member 6 has a projecting flange 23 formed with a shoulder 24 which engages against the latching flange 22 when the parts are in the position shown in FIGS. 1 and 3. Inward pressure (rightward when viewed as in FIGS. 1 and 6) on the protruding plunger-like outer end of the latch member 7, with sufficient force to overcome its spring 11, will move the latching flange 22 rightwardly from the latching position shown in FIG. 1 to the unlatching position shown in FIG. 6, where the latching flange 22 is no longer aligned with the shoulder 24 of the rack bar 6, thus releasing the rack bar so that its spring 8 can move the rack bar leftwardly when viewed as in FIG. 3, thereby turning the bolt 2 and its head or cross bar 5 to draw the cross bar tightly against the cooperating shoulders of the camera 12. This brings the wall 18 of the accessory snugly against the wall 16 of the camera. When it is desired to release the connection or lock between the accessory and the camera, manual pressure may be applied to the accessible head or handle 17 of the rack bar 6, to push it inwardly (rightward when viewed as in FIG. 3) against the force of its spring 8, thereby turning the bolt 2 in a loosening or releasing direction, so that the accessory can be detached from the camera, and if this inward pressure on the handle 17 is continued to its limit of motion, the shoulder 24 will be brought to the edge of the latching flange 22 so that this flange 22 can snap forwardly into latching engagement with the shoulder 24, under the influence of the spring 11, assuming that by this time the accessory 1 has been separated from the camera.

The opening 15 in the camera body or housing is slightly longer than the length of the cross bar 5 of the bolt, as seen in FIG. 4, but has a width somewhat less than the length of the cross bar 5, as seen in FIG. 5, so that when the cross bar is turned it will no longer pass through the opening 15 but will overlap the margins of the material in which the opening 15 is formed. These margins which cooperate with the cross bar 5 can be slightly tapered or inclined, if desired, like the circumferential taper of a conventional bayonet mounting such as commonly used for interchangeable lenses on cameras, but it is not necessary to provide such a wedge action or taper because, even if the inner surface on the camera housing are flat rather than wedged or tapered, the action of the screw threads 19 on the bolt will draw the bolt head 5 tight against the cooperating surfaces of the camera body.

Preferably the opening 15 in the camera housing is normally closed, to prevent access of dirt or foreign matter, by a closure member or wall 13, pressed by a light spring 14 to an outermost position with its outer surface flush with the surrounding outer surfaces of the camera housing, as illustrated in FIG. 2. When the accessory is to be attached to the camera, one first makes sure that the handle 17 has been pressed all the way to its extreme inward position, so that the spring 8 is pre-stressed and the rack member or bar 6 is latched in the pre-stressed position by the latching flange 22, and the cross bar 5 is in the position of orientation which will permit it to pass through the opening 15. Then the accessory is brought up against the camera body, the head or cross bar 5 will engage the outer surface of the closure plate 13 and press this plate inwardly against the force of its light spring 14, and at the same time the approaching motion of the accessory toward the camera body will cause the camera body to engage the protruding plunger-like end 7 of the latch, pushing the latch in against the force of its spring 11, thus releasing the rack shoulder 24 from the latch portion 22, so that the pre-stressed spring 8 may now act to move the rack member 6 longitudinally to rotate the bolt or shank 2 and thus tighten the lock part 5 against the cooperating interior surface around the margin of the opening 15 in the camera housing 12. The accessory 1 is thus firmly secured to the camera. If any looseness or wabbling occurs during continued use of the camera and its accessory, the force of the spring 8 will constantly tend to tighten the connection, so that a firm attachment is produced.

To remove the accessory, it is simply necessary to exert inward pressure on the externally accessible handle or knob 17 of the rack bar 6, so as to rotate the bolt 12 in a loosening direction and bring the cross piece or head 5 back to the orientation position shown in FIG. 4, whereupon it may be pulled out of the opening in the camera body.

Instead of a longitudinally movable straight rack 6, 9 for rotating the bolt 2, it is possible to use a gear segment meshing with the bolt to turn it, the gear segment being connected, for example, to a rotary knob accessible on the outside of the accessory housing, and being spring stressed in a direction to tighten the bolt, and latched by any suitable latch in the bolt-loosening position, with the latch preferably being automatically released by a plunger engaged by approaching movement of the camera, just as the latch 22, 24 is released by such approaching movement.

What is claimed is:

1. Securing means for securing an accessory element detachably to a photographic camera element, comprising bayonet-type locking means having a first part on one of said elements and a cooperating second part rotatably mounted on the other of said elements, said second part being rotatable from a disengaged position to an engaged position, spring means tending to rotate said second part from its disengaged position toward its engaged position, and releasable latching means for holding said second part in its disengaged position with said spring means tensioned, said first part comprising a rearwardly faced shoulder surrounding an aperture into which said second part may extend when said accessory element and said camera element are brought together in predetermined alignment with each other, and said second part comprising a rotary shank portion and a head portion so shaped that it may pass through said aperture freely when said shank portion is in a disengaged position of orientation, and may not pass through said aperture but will overlie and engage with said rearwardly faced shoulder of said first part when said shank portion is rotated to an engaged position of orientation.

2. The invention as defined in claim 1, wherein said shank is screw threaded to draw its head portion tightly against said shoulder as the shank is rotated from its disengaged position orientation toward its engaged position.

3. The invention as defined in claim 1, further comprising a closure member tending to close said aperture when said two elements are uncoupled from each other, and a spring urging said closure member toward closed position, said closure member being displaceable against the force of its spring by the act of inserting said head portion into said aperture.

4. Securing means for securing an accessory element detachably to a photographic camera element, comprising bayonet-type locking means having a first part on one of said elements and a cooperating second part rotatably mounted on the other of said elements, said second part being rotatable from a disengaged position to an engaged position, spring means tending to rotate said second part from its disengaged position toward its engaged position, and releasable latching means for holding said second part in its disengaged position with said spring means tensioned, said latching means including a release member projecting from the element on which it is mounted in a position to be engaged and moved by contact with the other element when the two elements are brought together in proper alignment to be coupled to each other, whereby the latching means will be automatically released as the two elements are being brought together, so that said spring means may then rotate said second part of said locking means to an engaged position.

5. The invention as defined in claim 4, wherein said latching means is a latch of the roller type.

6. Securing means for securing an accessory element detachably to a photographic camera element, comprising bayonet-type locking means having a first part on one of said elements and a cooperating second part rotatably mounted on the other of said elements, said second part being rotatable from a disengaged position to an engaged position, spring means tending to rotate said second part from its disengaged position toward its engaged position, and releasable latching means for holding said second part in its disengaged position with said spring means tensioned, said second part comprising a rotary bolt member screw threaded to move longitudinally as it rotates and having a head portion for engaging tightly with said first part as it rotates, said bolt member having gear teeth, and said spring means includes a toothed rack meshing with said teeth and a spring tending to move said rack logitudinally to rotate said bolt member, and said releasable latching means acts on said rack to hold said rack in a position where its spring is fully stressed and said rotary bolt member is maintained in its disengaged position of orientation.

7. The invention as defined in claim 6, further comprising a manually accessible handle operatively connected to said rack and effective, upon manual actuation, to move said rack to a position wherein said spring is fully stressed and said rotary bolt member is maintained in its disengaged position of orientation and wherein said latching means may hold said rack in such position.

8. Securing means for securing an accessory element detachably to a photographic element when the two elements are brought together in a given position of alignment and without any rotation of one element relative to the other, said securing means comprising locking means having a first part on one of said elements and a cooperating second part rotatably mounted on the other of said elements, said second part being rotatable from a disengaged position to an engaged position without requiring rotation of one element relative to the other element, said second part in its engaged position making contact with said first part and exerting pressure thereon in a direction to tend to draw said two elements toward each other, spring means tending to rotate said second part from its disengaged position toward its engaged position, said spring means being in tensioned condition when said second part is in its disengaged position, means for holding said spring means in its tensioned condition and said second part in its disengaged position, and means for automatically releasing said holding means by the act of bringing said two elements together in said given position of alignment, so that said holding means will thereby be released and said spring means will rotate said second part from its disengaged position toward its engaged position, to draw said two elements firmly together.

* * * * *